Sept. 20, 1932.  J. G. GRAMSA  1,878,494
CONTROLLING DEVICE FOR MOTION PICTURE PROJECTORS
Filed Jan. 2, 1929  4 Sheets-Sheet 2
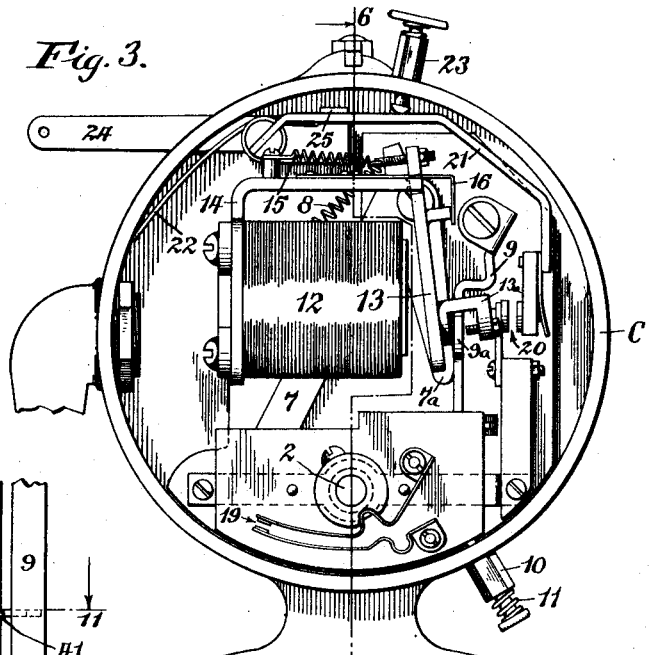
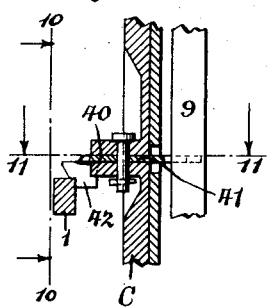
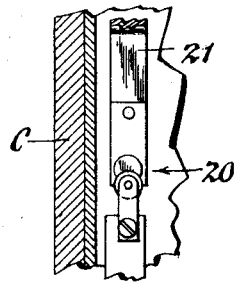
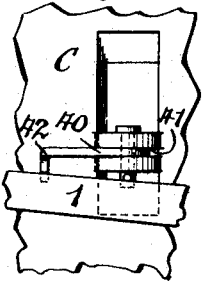
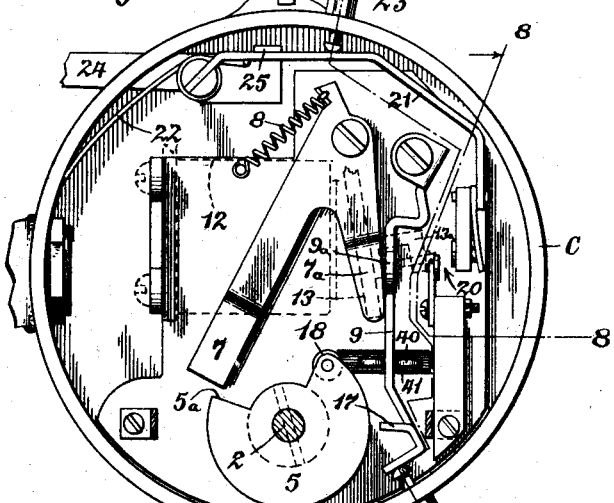
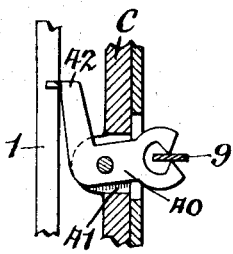
Inventor
Joseph G. Gramsa
By Popp and Powers
Attorney Inventor
Joseph G. Gramsa
Popp and Powers
Attorney Sept. 20, 1932.    J. G. GRAMSA    1,878,494
CONTROLLING DEVICE FOR MOTION PICTURE PROJECTORS
Filed Jan. 2, 1929    4 Sheets-Sheet 4

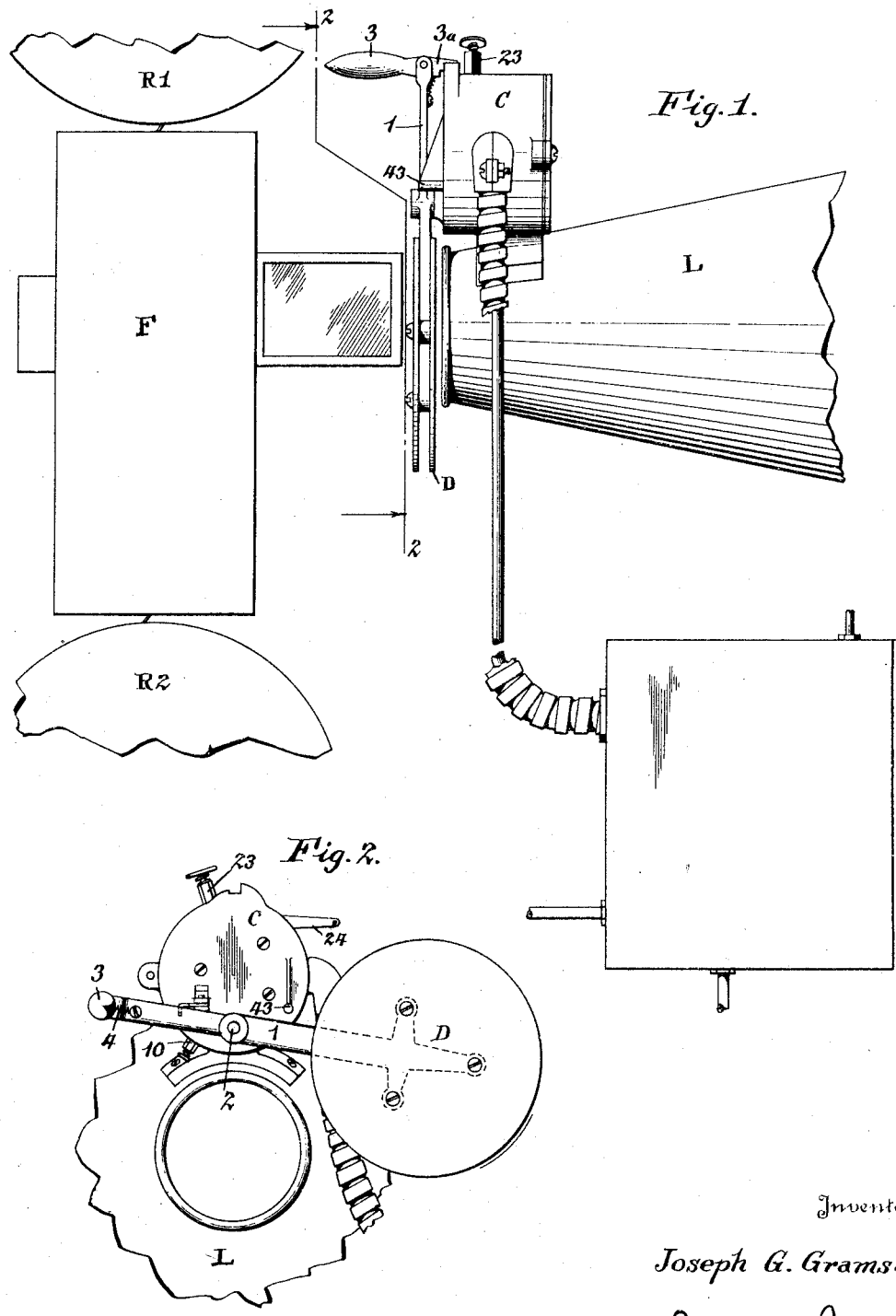

Inventor
Joseph G. Gramsa
By Popp and Powers
Attorney

Patented Sept. 20, 1932

1,878,494

UNITED STATES PATENT OFFICE

JOSEPH G. GRAMSA, OF BUFFALO, NEW YORK, ASSIGNOR OF ONE-HALF TO SIMON NIEMAN, OF BUFFALO, NEW YORK

CONTROLLING DEVICE FOR MOTION PICTURE PROJECTORS

Application filed January 2, 1929. Serial No. 329,745.

This invention relates to devices which are utilized in connection with motion picture projection apparatus for the protection of the film.

In motion picture projecting machines it is customary to mount a disc between the lamp-house and the film-driving mechanism for manually controlled pivotal movement into or out of the path of the projected beam of light. This disc is known as the "dowser" and is used for such purposes as "fading in" a film upon the screen and/or preventing the projected beam of light from striking the film when the latter is stationary or traveling under a certain "minimum" rate of speed. It has been proposed, however, to provide a semi-automatic safety device for controlling the operation of the dowser and it is to an improvement in such device that the present invention is directed.

The safety device referred to is electrically controlled and arranged to be rendered electrically operative at the same time that the film driving mechanism is started. While the driving mechanism is running, the safety device automatically functions to (1) permit the dowser to be moved manually out of the path of the projected beam of light when, and only when, the film is traveling above the "minimum" rate of speed, (2) hold the dowser out of the path after it has been so moved and until it is either manually or automatically released and (3) release the dowser either when the speed of the film falls below the "minimum" speed or when the film is torn. When the safety device is "off"—as it will be when the driving mechanism is idle or when the current controlling the device is turned "off"—the arrangement of the safety device is such as to (4) permit the dowser to be moved manually out of the path of the projected beam of light when, and only when, a latch-releasing button is manually operated but it will not function to (5) hold the dowser out of the path. It follows, therefore, that when the safety device is "off," the operator is compelled not only to tend to the various details of the machine but to the dowser as well. For example, during the projection of slides, the operator requires the use of both hands to manipulate the slides but since the projecting machine is idle, he must also hold the dowser up. While this can be done, it obviously handicaps his manipulation of the slides. Furthermore, at the conclusion of the run of slides, if a moving picture film is to be projected upon the screen, it can not be "faded in" because the operator must drop the dowser before going to the next machine to start it in operation. In the meantime, the screen is dark, which is objectionable to the patrons of the theater, and hence is to be avoided. Finally, if the safety device will not, for some reason, work automatically during the projection of a film, the operator must hold the dowser up manually thereby preventing him from tending to his other duties. In such case, it is generally necessary to tie the dowser in the up position. This, however, introduces a very serious fire hazard— inasmuch as a drop below the "minimum" speed of the film driving mechanism may cause the film to ignite before the operator can release the dowser—which the safety device is primarily designed to prevent.

The principal object of the present invention is to incorporate in the safety device means for latching the dowser in "up" position when the driving mechanism is idle or when the safety device is otherwise inoperative, which means will not interfere with the normal operation of the safety device.

Embodiments of a safety device construction in which the invention is incorporated, is illustrated in the accompanying drawings, wherein:

Figure 1 is a schematic side elevation showing the arrangement of the safety device with respect to the lamp house and the film driving mechanism.

Figure 2 is a front elevation of the safety device taken along line 2—2 of Figure 1.

Figure 3 is a rear elevation of the safety device with the rear cover plate removed.

Figure 4 is a view similar to that shown in Figure 3, parts of the device being omitted to illustrate the construction more clearly. In this view, like that of Figure 3, the dowser is positioned to cover the apertured end of the lamp house.

Figure 8 is a fragmentary section along line 8—8 of Figure 4.

Figure 9 is a fragmentary section of the latching mechanism which extends through the front wall of the safety device.

Figure 10 is a fragmentary front elevation of the latching mechanism shown in Figure 9.

Figure 11 is a fragmentary top plan view of the latching arm.

Figure 12:
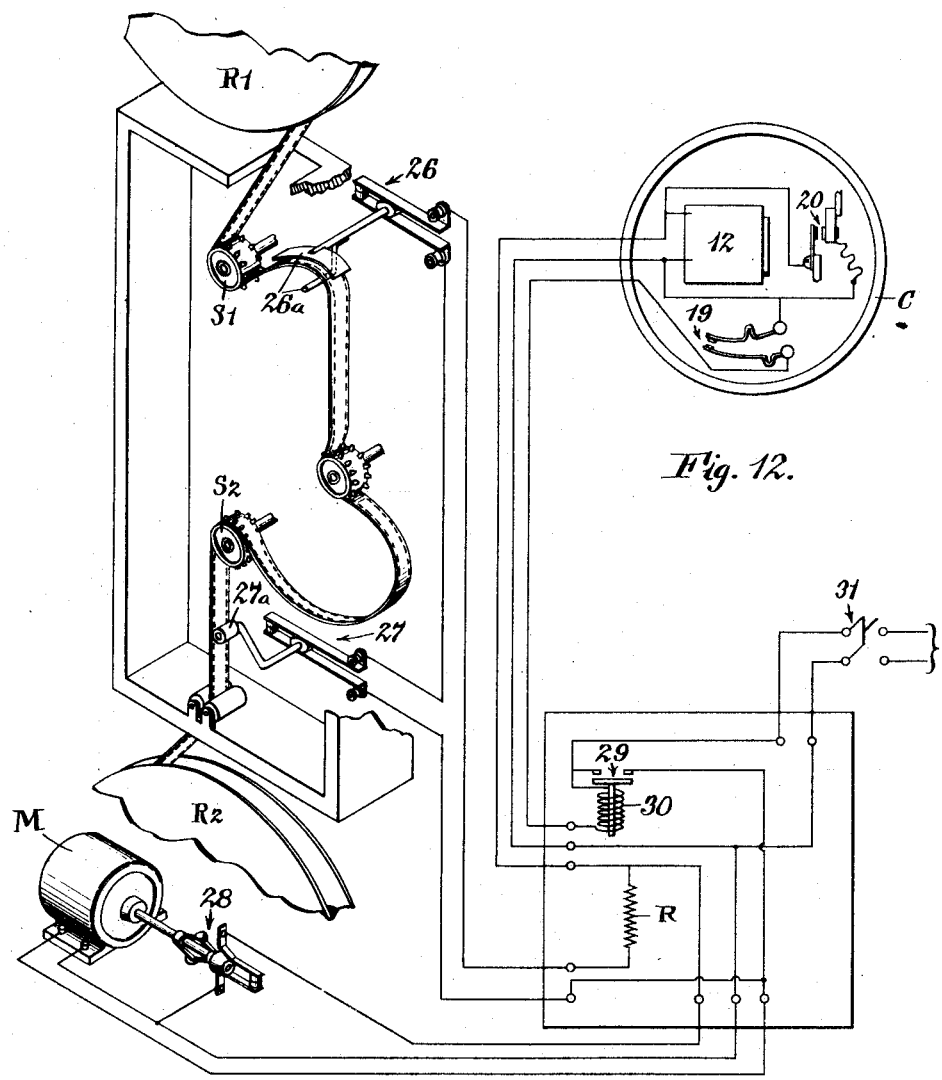
Figure 12 is a schematic view showing the circuit arrangement of the device in relation to the various switches and the film.

The safety device may be applied to any suitable type of projecting apparatus and is shown in Figures 1 and 12 in connection with the lamp-house and the film driving mechanism, these parts being indicated generally at L and F respectively. During the operation of the projector, the film passes from the upper reel R1 around the upper sprocket S1 and thence over a shutter-controlled aperture and around the lower sprocket S2 to the lower reel R2, while the lamp-house L is arranged to project a beam of light through the shutter controlled aperture, and hence through the film, to the screen.

The dowser D is, as previously stated, arranged for pivotal movement into and out of the path of the beam of light projected from the lamp-house L. To this end the dowser D is mounted on one end of a cross arm 1 which is secured, intermediate its ends, to an angularly movable shaft 2 extending transversely into the safety device. The latter is indicated in Figures 1 and 2 by a showing of its casing C and, as shown, is mounted on the lamp-house L in such manner as to permit the dowser D to swing at right angles to the path of light between limits sufficient to cover or uncover the apertured end of the lamp-house L, these limits being hereinafter termed the down and up positions respectively of the dowser. The cross arm 1, at the end opposite the dowser, is provided with a handle 3 by which the dowser may be manually moved. The handle 3 is pivotally secured to the cross arm and is provided with an extension 3a which fits into a groove formed in the casing C to latch the dowser in the down position. The extension 3a is releasably held in the groove by a spring 4.

The dowser shaft 2 carries on its inner end, a pair of spaced cam plates 5 and a cylindrical block 6, the latter being composed of insulating material. The spaced cam plates 5 have a segment removed to provide a radially extending surface 5a which is engaged by an arm 7 when the dowser is moved a slight distance toward the up position. The arm 7 is pivotally mounted on the casing C and normally is held in the path of movement of the cam surface 5a by a spring 8. The arm 7 thus functions to permit the dowser to be moved a slight distance toward the up position but prevents a movement sufficient to uncover the apertured end of the lamp-house L.

Figure 5:
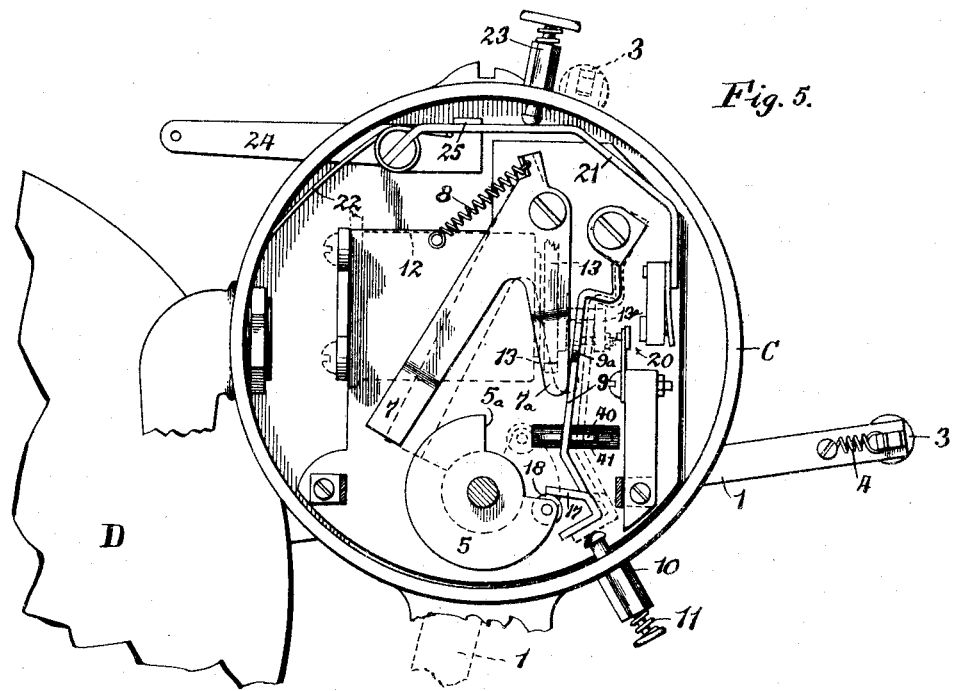
Figure 5 is a view similar to that shown in Figure 4 except that the dowser is positioned to uncover the apertured end of the lamp house, the position of the parts corresponding to the initial movement of the dowser being shown in dotted lines.
Figures 6, 7:
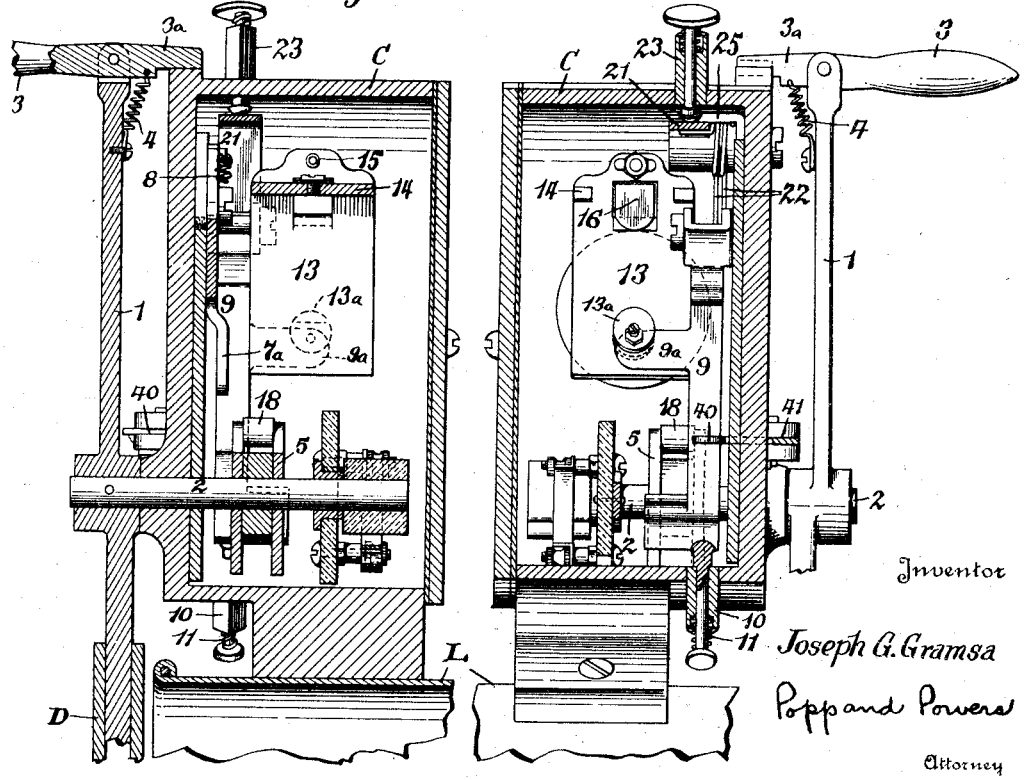
Figure 6 is a section along line 6—6 of Figure 3.
Figure 7 is a section along a line corresponding to line 7—7 of Figure 4.

In order to move the arm 7 out of the path of movement of the cam surface 5a, and thereby permit the dowser to be moved to the up position so as to uncover the lamp-house aperture, the arm 7 is formed with an auxiliary arm 7a. The free end of the auxiliary arm 7a, as shown in Figures 4 and 5, normally is held by the spring 8 in abutting relation with an arm 9 which also is pivotally mounted on the casing C. It is evident that a movement of the arm 9 from its normal position will force the auxiliary arm 7a about its pivot with resultant movement of the arm 7 out of the path of the cam surface 5a. When this is done, the dowser can be moved to the up position.

The movement of the arm 9 is controlled both manually and automatically. The manual movement of the arm is controlled by a plunger 10 which extends through the casing C. The plunger is urged outwardly from the casing by a spring 11, the inner end of the plunger being enlarged to prevent complete withdrawal. This enlarged end abuts the free end of the arm 9, the latter being turned or bent over in such manner that when the plunger 10 is pressed inwardly, the arm 9 is forced to swing from its normal position toward the cam plates a distance sufficient to move the arm 7 out of the path of the radial surface of the cam plates thereby permitting the manual movement of the dowser to the up position.

The automatic movement of the arm 9 is controlled through the coil 12 and the armature 13, the latter forming a part of the magnetic circuit of the coil 12 being the connecting link between one end of the yoke 14 and the core of the coil. This armature is mounted on the yoke for pivotal movement toward or away from one end of the coil 12 but is normally held away by a spring 15, the position being determined by a stop 16. The armature 13 is connected to the arm 9 by a U-shaped member 13a which is secured to the armature and arranged to straddle a projection 9a extending from the arm 9. Thus it will be seen that an initial movement of the armature 13 will, through the agency of U-shaped member 13a, projection 9a and arm 9, move the arm 7 out of the path of the cam plates 5 thereby permitting the dowser to be moved to the up position. The movement of the armature 13 is, of course, controlled by the coil 12 and in order to prevent the armature 13 from initially moving up against the core of the coil, the arm 9 is provided with a tang 17 which engages the peripheral surface of the cam plates after the arm 9 has moved sufficiently to bring the arm 7 out of the path of the cam plates. The movement of the armature 13 is thus limited until the dowser reaches the up position at which point the armature is free to complete its movement toward the coil inasmuch as the cam plates have been rotated to the point where their cut away segment is brought opposite to the tang 17. This full or final movement of the armature 13 causes a further movement of the arm 9 thus moving the tang 17 into the cut away segment to a position where it overlies and engages a roller 18 extending between and carried by the cam plates thereby latching the dowser in the up position.

It will be readily appreciated that the dowser will remain in the up position as long as the coil 12 remains energized. Should anything occur to deenergize the coil, the armature 13 will be returned immediately to its normal position by the spring 15 with resultant movement of the tang 17 from the latching position thereby permitting the dowser to drop to the down position.

The coil 12 is controlled by a circuit arrangement involving two switches within the casing C of the device. One of these switches which is indicated at 19, is operated by the cylindrical block 6 on the shaft 2. A contact of this switch is provided with a bent portion which, when the dowser is in the down position, fits into a groove formed in the block 6, the arrangement being such as to close the switch at the point where the cam plates strike the arm 7 and to hold it closed during all movements beyond this point.

The other switch within the device as indicated at 20 includes a stationary contact and a movable contact, the latter being operated by a pivotally supported arm 21 on the casing C. This switch normally is held open by a spring 22 but may be closed by a spring pressed plunger 23 which extends through the casing C with its inner end abutting the contact arm 21. This plunger is similar in construction and operation to the plunger 10. The switch 20 may also be closed by a pivotally mounted lever 24 which extends through the wall of the casing C. The lever 24 has the same pivot as the arm 21 and is connected to the arm through a lug 25 which overlies the arm.

The circuit arrangement which is shown in Figure 12 also includes a switch 26 adjacent the upper sprocket S1, a switch 27 adjacent the lower sprocket S2, a speed switch 28 connected to the driving motor M, and a line contactor 29 with its operating coil 30 which may be conveniently located in a suitably mounted control box.

The upper sprocket switch 26 is operated by a loosely mounted member 26a which is arranged adjacent a loop in the film, the arrangement being such that when the film buckles or becomes torn, it moves the member thereby opening the switch contacts.

The lower sprocket switch 27 is operated by a member 27a which is held in its proper position by the film, this member riding loosely against the film. When the film breaks, buckles or otherwise moves from its proper position, it causes the operating member to move thereby opening the contacts.

The speed switch 28 utilized may be any suitable arrangement for opening a pair of contacts when the speed of the film rises above a certain value and for closing the contacts when the film speed drops below such value. As shown this switch is operated directly from the driving motor M but it may, of course, be otherwise operated.

In the circuit arrangement, the motor M is arranged in series with the line contactor 29 and connected directly across the power line. The operating coil 30 of contactor 29 is arranged in series with the switch 19 of the safety device and connected directly across the power line. The coil 12 of the safety device is arranged in parallel with both the switch 20 of the safety device and the speed switch 28, these contacts functioning, when closed, to shortcircuit the coil. This ensemble is arranged in series with a current limiting resistor R, the upper and lower sprocket switches 26 and 27 and the line contactor 29 and connected directly across the line. The power line is controlled by the switch 31.

With the film is arranged in the projector the power switch 31 closed, and the dowser in the down position, the light projected from the lamp-house is cut off and the screen dark. When the dowser is moved to the point where the radial surface of the cam plates 5 strike the arm 7, the cylindrical block 6 operates the switch 19 in the safety device thereby closing the circuit of the line contactor coil 30. This coil operates the line contactor 29 closing the circuit of the motor M. When the motor speed rises above the value at which the speed switch 28 is set, this switch is operated to open its contacts thereby removing the short circuit around the coil 12. The coil 12 is thus energized and pulls the armature 13 over until the tang 17 strikes the peripheral surface of the cam plates 5 which movement is sufficient to move the arm 7 out of the path of the radial surface of the cam plates permitting the dowser D to be moved to the up position. When the dowser reaches the up position, the coil 12 pulls the armature 13 over against the core of the coil which brings the tang 17 into latching position thus automatically holding the dowser in the up position.

The dowser, as previously stated, will remain in the up position so long as the coil 12 remains energized. The coil will, however, be deenergized when (1) the upper sprocket switch 26 is opened by the buckling or tearing of the film, or (2) the lower sprocket switch 27 is opened by the buckling or breaking of the film, or (3) the coil short circuiting speed switch 28 is closed by a drop in speed below the set value, or (4) the coil short circuiting switch 20 in the safety device is closed by the manual operation of the plunger 23 or the lever 24. As soon as the dowser drops, the switch 19 in the safety device is opened thereby opening the circuit of the line contactor coil 30 which in turn opens the circuit of the motor at the line contactor 29 thus completely shutting down the projector.

When the machine is idle as during the projection of slides, it is necessary to raise the dowser to the up position. The device as thus far described permits the dowser to be raised to the up position through the lower plunger 10 but no means are provided for holding the dowser in such position. It is to such means that the present invention is directed.

The holding means proposed include a bell crank lever 40 which is pivotally mounted on the casing C adjacent the angular path of movement of the cross arm 1. The free end of one arm of the lever 40 is forked and extends transversely into the casing C through a slot 41 formed in the casing wall. The forked end of the lever is arranged to straddle the arm 9 whereby a movement of this arm effects a similar movement of the lever. The opposite arm of the bell crank lever 40 projects horizontally along the adjacent outer wall of the casing C with its free end turned or bent outwardly so as to extend toward, and substantially at right angles to, the angular path of movement of the cross arm 1, this end being indicated at 42. The arrangement of the lever 40 is such that when the arm 9 is in its normal position, the free end 42 of the lever is positioned to engage and latch the cross arm in a position corresponding to the up position of the dowser while the initial movement of the arm 9 from its normal position is sufficient to unlatch the cross arm 1.

With this construction it is evident that when the plunger 10 is pressed inward, it not only moves the arm 7 out of the path of the radial surface 5a of the cam plates 5 as previously described, but also effects a withdrawal of the latching end 42 of the lever 40 from the latching position thereby permitting the dowser to be moved to the up position. It may be noted that continued movement of the dowser beyond the latching end 42 is prevented by a stop 43 (see Fig. 2) which is formed on the casing C and arranged to engage the cross arm 1 at the up position. The dowser is latched in this position simply by releasing the plunger 10 thereby permitting the spring 15 to return the arm 9 to its normal position which, of course, places the latching end 42 in the latching position. To unlatch the dowser it is only necessary to press the plunger 10 inward.

When the device is operated automatically, the movement of the arm 9 from its normal position will cause the latching end 42 to withdraw from the latching position. When the coil 12 is deenergized, the dowser will fall as the latching end 42 returns toward the latching position. In order to prevent any possibility of the latching end 42 returning, after the coil 12 is deenergized, and relatching the cross arm 1 before it starts to return toward the down position, the tang 17 preferably is arranged to hold the cross arm at a position slightly in advance of the position in which it is held by the latching end 42. In other words, the latching end 42 latches the cross arm in the position in which it is engaged by the stop 43 while the tang 17 latches it slightly before it reaches the stop 43. With this arrangement, if the end 42 returns before the cross arm 1 starts to move, it merely strikes the side of the cross arm at which point it is ineffectual to latch the arm. The cross arm 1 may at this point be provided with a groove to permit the end 42 to return to its original position without latching the arm 1.

Figure 13:
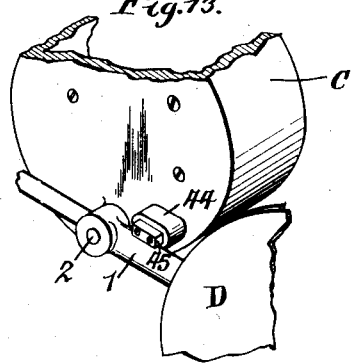
Figure 13 is a perspective of a different form of construction as it appears when attached to the safety device.
Figure 14:
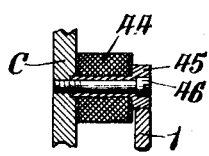
Figure 14 is a fragmentary section of the construction shown in Figure 13.

A widely different form of holding means is illustrated in Figures 13 and 14 consisting essentially of a magnetic coil 44 and core 45. The coil 44 functions, when energized, to hold the arm 1 in the up position with sufficient force to prevent its accidental release while, at the same time, permitting it to be manually forced from the up position with comparative ease. The coil and core may be located as desired but preferably is located above the cross arm 1 in place of the stop 43, the position preferably being such that the core engages the cross arm at the position it occupies when latched by the tang 17 and roller 18. The core 45 may be made as an integral part of the casing C but it preferably is removably attached by means of screw bolts 46. The coil may be energized by the provision of a suitable switch in place of the power switch 31. For this purpose any suitable three position switch may be utilized which when turned to one position will connect only the so-called automatic circuit to power, when turned to the second position will connect the coil 44 to power and when turned to the third position will disconnect the source of power. A switch of this type is so well known and the operating circuit so simple that illustration is deemed unnecessary. Thus when the automatic system is disconnected and the coil 44 energized, the dowser D may, through the agency of the lower plunger 10, be raised to the up position at which point it is held by the magnetism set up in the core 45. To release the dowser, it is necessary only to move the arm 1 manually away from the core 45 or disconnect the power so as to deenergize the coil in which case the weight of the dowser overcomes the attraction between the arm 1 and the core 45 due to the residual magnetism in the core thereby insuring the return of the dowser to the down position. Obviously when the automatic mechanism is utilized, the coil 44 will be deenergized.

The positions at which the dowser cuts the beam of light on and off are respectively termed up and down positions. It will, of course, be understood that such terms are utilized for the sake of brevity and not intended as a limitation of the claims.

Having fully described my invention, I claim:

1. In a device for controlling the movement of the dowser of a motion picture projector between down and up positions to protect the film and having means normally operative to lock the dowser in the down position, the combination of automatic means normally conditioned upon the increase in the speed of travel of the film above a set value to render said locking means inoperative and thereby permit the movement of the dowser to the up position and means to hold the dowser in such position, with manually controlled means to enable movement of the dowser to the up position when the automatic means are not conditioned for operation and to hold the dowser in such position when so moved, said manually controlled means being inoperative to hold the dowser in the up position when said automatic means are conditioned for such operation.

2. In a device for controlling the movement of the dowser of a motion picture projector between down and up positions to protect the film and having means normally operative to lock the dowser in the down position, the combination of automatic means normally conditioned upon the increase in the speed of travel of the film above a set value to render said locking means inoperative and thereby permit the movement of the dowser to the up position and means to hold the dowser in such position with manually controlled means to enable movement of the dowser to the up position when the automatic means are not conditioned for operation and means for latching the dowser when so moved, said means last mentioned being rendered inoperative by movement to unlatching position when said automatic means are conditioned to latch the dowser in the up position.

3. In a device for controlling the movement of the dowser of a motion picture projector between down and up positions to protect the film, which device includes means normally operative to prevent a movement of the dowser to the up position, the combination of an element which is adapted for slight movement from its normal position to render said preventing means inoperative and thereby permit the dowser to be moved to the up position and which when the dowser is so moved is adapted for further movement to effect the latching of the dowser in such position, and automatic means normally conditioned upon the increase in the speed of travel of the film above a set value, to so move said element, with manually controlled means to enable movement of the dowser to the up position when the automatic means are not conditioned for operation, and means for holding the dowser in such position, said means last mentioned being rendered inoperative by movement to unlatching position when said automatic means effects the latching of the dowser.

4. In a device for controlling the movement of the dowser of a motion picture projector between down and up positions to protect the film, which device includes means normally operative to prevent a movement of the dowser to the up position, the combination of an element which is adapted for slight movement from its normal position to render said preventing means inoperative and thereby permit the dowser to be moved to the up position and which when the dowser is so moved is adapted for further movement to effect the latching of the dowser in such position, and automatic means normally conditioned upon the increase in the speed of travel of the film above a set value, to so move said element with manually controlled means arranged to operate said element sufficiently to render said preventing means inoperative and a pivotally mounted lever connected to said element and arranged normally to extend into a position at which it is adapted to latch the dowser in the up position, said lever being moved to unlatching position by the initial movement of said element from its normal position, whereby when said manually controlled means are operated to render said preventing means inoperative, the lever is moved to its unlatching position thereby permitting the dowser to be moved to the up position at which point it is latched by said lever upon the release of said manually controlled means.

In testimony whereof I hereby affix my signature.

JOSEPH G. GRAMSA.